United States Patent [19]

Jäger

[11] Patent Number: 4,591,643
[45] Date of Patent: * May 27, 1986

[54] TRIPHENDIOXAZINE REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[*] Notice: The portion of the term of this patent subsequent to May 13, 2003 has been disclaimed.

[21] Appl. No.: 657,304

[22] Filed: Oct. 3, 1984

[30] Foreign Application Priority Data

Oct. 6, 1983 [DE] Fed. Rep. of Germany ........ 3336362

[51] Int. Cl.$^4$ .................... C09B 19/00; C09B 19/02
[52] U.S. Cl. .......................................... 544/76; 544/75
[58] Field of Search ........................... 544/75, 76

[56] References Cited

U.S. PATENT DOCUMENTS

| | | | |
|---|---|---|---|
| 3,996,221 | 12/1976 | Leng et al. | 544/75 X |
| 4,092,478 | 5/1978 | Plant et al. | 544/76 |
| 4,336,377 | 6/1982 | Adam et al. | 544/74 X |
| 4,400,504 | 8/1983 | Harms et al. | 544/76 |
| 4,472,575 | 9/1984 | Renfrew | 544/76 |
| 4,512,773 | 4/1985 | Anderton et al. | 544/74 X |

FOREIGN PATENT DOCUMENTS 101665 2/1984 European Pat. Off. .

*Primary Examiner*—Richard L. Raymond
*Attorney, Agent, or Firm*—Sprung Horn Kramer & Woods

[57] ABSTRACT

The present invention provides new triphendioxazine dyestuffs of the formula

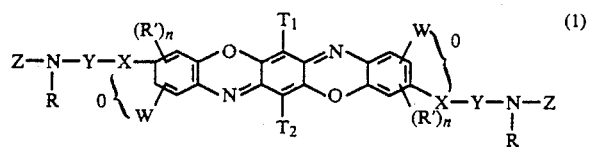

wherein W represents an optionally substituted sulphonamide group Z represents a reactive group or hydrogen and the other substituents are defined as in the text of the application.

The new reactive dyes are highly suitable for dyeing and/or printing hydroxyl-containing and/or amide-containing fibre materials. The dyestuffs where Z is H are intermediates in the preparation of the reactive dyestuffs.

9 Claims, No Drawings

TRIPHENDIOXAZINE REACTIVE DYESTUFFS

The present invention relates to new triphendioxazine dyestuffs of the formula

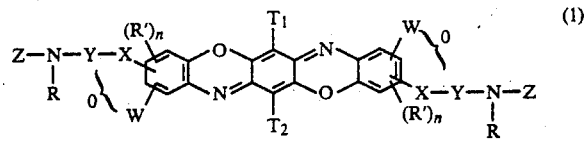

wherein
R represents hydrogen or optionally substituted $C_1$-$C_6$-alkyl,
$T_1$ and $T_2$, independently of each other, each represent H, Cl, Br, optionally substituted $C_1$-$C_4$-alkoxy, $C_1$-$C_4$-alkyl, phenyl or phenoxy,
X represents O, S or

Z denotes a reactive group or hydrogen,
Y represents an optionally further-substituted divalent aliphatic, araliphatic, cycloaliphatic or aromatic radical,
R' represents halogen, in particular Cl and Br, $SO_3H$, COOH, optionally substituted $C_1$-$C_4$-alkyl or $C_1$-$C_4$-alkoxy,
R" represents hydrogen or optionally substituted $C_1$-$C_4$-alkyl, and, in the event that Y denotes an optionally substituted divalent aliphatic radical, also, together with R, alkylene, preferably —$CH_2CH_2$—,
n denotes 0 or 1 and
W represents an optionally substituted sulphonamide group
and wherein
the radical W is in the ortho-position relative to the substituent

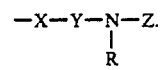

The substituent

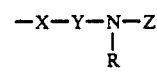

is preferably in the p-position relative to the ring hydrogen.

In the formula (1) the radical W preferably represents an optionally substituted sulphonamide radical of water-solubilising groups, such as $SO_3H$ or COOH.

W represents in particular the following groupings:
(a) a radical of the formula

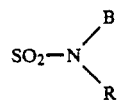

where
B is $C_2$-$C_6$-alkylene—(O)$_n$—$SO_3H$ wherein n is 0 or 1
and where R can in particular also represent B,
(b) a radical of the formula $SO_2$—NH—$SO_2$—R'''
where
R''' represents optionally substituted $C_1$-$C_6$-alkyl (preferably $CH_3$) or aryl (in particular optionally substituted phenyl),
(c) a radical of the formula

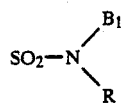

where
$B_1$ is an aromatic radical having at least one $SO_3H$ group, preferably a phenyl radical having 1 or 2 $SO_3H$ groups.

Suitable substituents for optionally substituted $C_1$-$C_6$-alkyl R are OH, $OCH_3$, COOH, $SO_3H$ or $OSO_3H$.

Examples of R are $CH_3$, $C_2H_5$, $nC_3H_7$, $i$-$C_3H_7$ and $n$-$C_4H_9$, which can all be substituted by OH, $OCH_3$, COOH or $SO_3H$. Examples of substituents of the phenyl and phenoxy radicals $T_1$ and $T_2$ are Br, Cl, $CH_3$, $C_2H_5$, $OCH_3$ and $OC_2H_5$.

The radicals Y, if further substituted, preferably bear the following further substituents: $SO_3H$, COOH, $CH_3$, $OCH_3$, optionally substituted phenyl. The araliphatic, aliphatic or cycloaliphatic radicals Y can further be interrupted by hetero atom groups or by the phenylene grouping. Examples which should be mentioned are O, S, NH, N(COCH$_3$).

Aromatic radicals Y can be for example as follows:

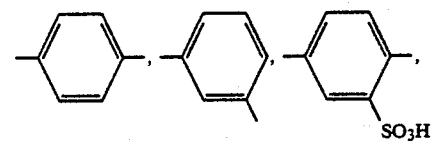

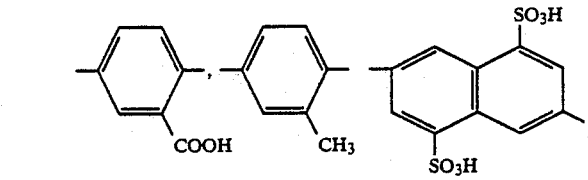

Araliphatic radicals Y can be for example as follows:

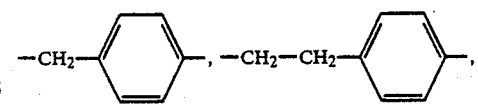

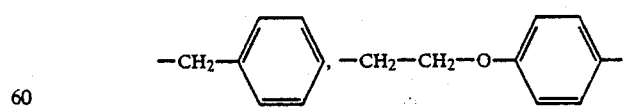

Aliphatic and cycloaliphatic radicals Y can be for example as follows:

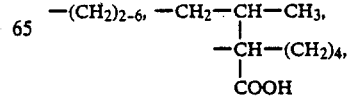

-continued $-CH_2-CH-C_2H_5,$
$\quad\quad\quad |$
$-CH_2-CH_2-O-CH_2-CH_2-$ $-CH_2-CH-CH_2-,$
$\quad\quad\quad\quad\quad\; |$
(phenyl with SO_3H)

$-CH_2-CH_2-S-CH_2-CH_2-,$ $-CH_2-CH_2-N-CH_2-CH_2-$
$\quad\quad\quad\quad\quad |$
$\quad\quad\quad\quad\; COCH_3$ (cyclohexyl-), $-CH_2-$(phenyl)$-CH_2-$, $-CH_2-$(phenyl-)$-CH_2-$(cyclohexyl)

Examples of radicals B are:

$-(CH_2)_{2-4}-SO_3H,\; -(CH_2)_2-OSO_3H,\; -CH_2-CHSO_3H,$
$\quad\quad\quad\quad\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad\quad\quad\quad CH_3$ $-CH_2-CHOSO_3H,\; -CH-CH_2OSO_3H$
$\quad\quad\quad |\quad\quad\quad\quad\quad\quad |$
$\quad\quad\; CH_3\quad\quad\quad\quad\; CH_3$ A suitable $-X-Y-N-$ radical is in particular also
$\quad\quad\quad\quad\quad\quad\quad\quad\quad\quad\quad |$
$\quad\quad\quad\quad\quad\quad\quad\quad\quad\quad\quad R$ $\quad\quad\quad\quad CH_2-CH_2$
$\quad\quad\quad\quad /\quad\quad\quad\; \backslash$
$-N\quad\quad\quad\quad\quad\quad\; N-$
$\quad\quad\quad\quad \backslash\quad\quad\quad\; /$
$\quad\quad\quad\quad CH_2-CH_2$ Suitable reactive groups Z contain in particular at least one reactive substituent bonded to a 5- or 6-membered aromatic heterocyclic ring or more specifically to a monazine, diazine, triazine, for example pyridine, pyrimidine, pyridazine, pyrazine, thiazine, oxazine or asymmetrical or symmetrical triazine ring or to such a ring system as has one or more fused-on aromatic carbocyclic rings, such as a quinoline, phthalazine, cinnoline, quinazoline, quinoxaline, acridine, phenazine and phenanthridine ring system.

Examples of the reactive substituents on the heterocyclic structure are halogen (Cl, Br or F), ammonium, including hydrazinium, sulphonium, sulphonyl, azido- ($N_3$), thiocyanato, thio, thiol ethers, oxy ethers, sulphinic acid and sulphonic acid.

Specific examples are 2,4-difluorotriazinyl, 2,4-dichlorotriazin-6-yl, monohalogeno-sym.-triazinyl radicals, in particular monochloro- and monofluoro-triazinyl radicals which are substituted by alkyl, aryl, amino, monoalkylamino, dialkylamino, aralkylamino, arylamino, alkoxy, aryloxy, alkylthio or arylthio, alkyl being preferably optionally substituted $C_1-C_4$-alkyl, aralkyl being preferably optionally substituted phenyl-$C_1-C_4$-alkyl and aryl being preferably optionally substituted phenyl or naphthyl and preferred substituents for alkyl being hydroxyl, cyano, $C_1-C_4$-alkoxy, carboxyl, sulpho or sulphato and for phenyl and naphthyl sulpho, $C_1-C_4$-alkyl, $C_1-C_4$-alkoxy, carboxyl, halogen or acylamino.

Specific radicals are 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-$\beta$-methoxyethylamino-4-fluorotriazin-6-yl, 2-$\beta$-hydroxyethylamino-4-fluorotriazin-6-yl, 2-di-($\beta$-hydroxyethylamino)-4-fluorotriazin-6-yl, 2-$\beta$-sulphoethylamino-4-fluorotriazin-6-yl, 2-$\beta$-sulphoethyl-methylamino-4-fluorotriazin-6-yl, 2-carboxymethylamino-4-fluorotriazin-6-yl, 2-$\beta$-cyanoethylamino-4-fluorotriazin-6-yl, 2-benzoylamino-4-fluorotriazin-6-yl, 2-$\beta$-phenylethylamino-4-fluorotriazin-6-yl, 2-benzylmethylamino-4-fluorotriazin-6-yl, 2-(x-sulphobenzyl)-amino-4-fluorotriazin-6-yl, 2-cyclohexylamino-4-fluorotriazin-6-yl, 2-(o-,m-,p-methylphenyl)-amino-4-fluorotriazin-6-yl, 2-(o-,m-,p-sulphophenyl)-amino-4-fluorotriazin-6-yl, 2-(2′,5′-disulphophenyl)-amino-4-fluorotriazin-6-yl, 2-(o-,m-,p-chlorophenyl)-amino-4-fluorotriazin-6-yl, 2-(o-,m-,p-methoxyphenyl)-4-fluorotriazin-6-yl, 2-(2′-methyl-4′-sulphophenyl)-amino-4-fluorotriazin-6-yl, 2-(2′-methyl-5′-sulphophenyl)-amino-4-fluorotriazin-6-yl, 2-(2′-chloro-4′-sulphophenyl)-amino-4-fluorotriazin-6-yl, 2-(2′-chloro-5′-sulphophenyl)-amino-4-fluorotriazin-6-yl, 2-(2′-methoxy-4′-sulphophenyl)-amino-4-fluorotriazin-6-yl, 2-(o-,m-,p-carboxyphenyl)-amino-4-fluorotriazin-6-yl, 2-(2′,4′-disulphophenyl)-amino-4-fluorotriazin-6-yl, 2-(3′,5′-disulphophenyl)-amino-4-fluorotriazin-6-yl, 2-(2′-carboxy-4-sulphophenyl)-amino-4-fluorotriazin-6-yl, 2-(6′-sulphonaphth-2′-yl)-amino-4-fluorotriazin-6-yl, 2-(4′,8′-disulphonaphth-2′-yl)-amino-4-fluorotriazin-6-yl, 2-(6′,8′-disulphonaphth-2′-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-$\beta$-hydroxyethylphenyl)-amino-4-fluorotriazin-6-yl, 2-(N-iso-propylphenyl)-amino-4-fluorotriazin-6-yl, 2-morpholino-4-fluorotriazin-6-yl, 2-piperidino-4-fluorotriazin-6-yl, 2-(4′,6′,8′-trisulphonaphth-2′-yl)-4-fluorotriazin-6-yl, 2-(3′,6′,8′-trisulphonaphth-2′-yl)-4-fluorotriazin-6-yl, 2-(3′,6′-disulphonaphth-1′-yl)-4-fluorotriazin-6-yl, N-methyl-N-(2,4-dichlorotriazin-6-yl)-carbamyl-, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, 2-methoxy-4-fluorotriazin-6-yl, 2-ethoxy-4-fluorotriazin-6-yl, 2-phenoxy-4-fluorotriazin-6-yl, 2-(o-,m- or p-sulphophenoxy)-4-fluorotriazin-6-yl, 2-(o-,m- or p-methyl- or -methoxy-phenoxy)-4-fluorotriazin-6-yl, 2-$\beta$-hydroxyethylmercapto-4-fluorotriazin-6-yl, 2-phenylmercapto-4-fluorotriazin-6-yl, 2-(4′-methylphenyl)-mercapto-4-fluorotriazinyl, 2-(2′,4′-dinitrophenyl)-mercapto-4-fluorotriazin-6-yl, 2methyl-4-fluorotriazin-6-yl, 2-phenyl-4-fluorotriazin-6-yl, and the corresponding 4-chloro and 4-bromo radicals as well as the corresponding halogen-substituted radicals obtainable with tertiary bases such as trimethylamine, triethylamine, dimethyl-$\beta$-hydroxyethylamine, triethanolamine, N,N-dimethylhydrazine, pyridine, $\alpha$- or $\gamma$-picoline, nicotinic acid or isonicotinic acid or sulphinates in particular benzenesulphinic acid.

Monohalogeno pyrimidinyl, dihalogenopyrimidinyl or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)-phenylsulphonyl or -carbonyl, β-(4',5'-dichloropyridaz-6'-yl-1')-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl as well as the corresponding bromine and fluorine derivatives of the abovementioned chlorine-substituted heterocyclic radicals, of these for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl, 2-fluoro-5-chloropyrimidin-4-yl, 2-methyl-4-fluoro-5-methylsulphonylpyrimidinyl-6, 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl, sulphonyl-containing triazine radicals, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl, 2,4-bis-(3'-carboxyphenyl-sulphonyl)-triazin-6-yl, sulphonyl-containing pyrimidine rings, such as 2-carboxymethylsulphonyl-pyrimidin-4-yl, 2-methylsulphonyl-6-methyl-pyrimidin-4-yl, 2-methylsulphonyl-6-ethylpyrimidin-4-yl, 2-phenylsulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-ethylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxypyrimidin-4-yl, 2-methylsulphonyl-5-sulphopyrimidin-4-yl, 2-methylsulphonyl-6-carbomethoxypyrimidin-4-yl, 2-methylsulphonyl-5-carboxy-pyrimidin-4-yl, 2-methylsulphonyl-5-cyano-6-methoxypyrimidin-4-yl, 2-methylsulphonyl-5-chloro-pyrimidin-4-yl, 2-sulphoethylsulphonyl-6-methylpyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl, 2-chlorobenzothiazole-5- or -6-carbonyl or -5- or -6-sulphonyl, 2-arylsulphonyl or -alkylsulphonylbenzothiazole-5- or -6-carbonyl or -5- or -6-sulphonyl such as 2-methylsulphonyl- or 2-ethylsulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives which contain sulphur groups in the fused-on benzene ring, 2-chlorobenzoxazole-5- or -6-carbonyl or -sulphonyl, 2-chlorobenzimidazole-5- or -6-carbonyl or -sulphonyl, 2-chloro-2-methylbenzimidazole-5- or -6-carbonyl or -sulphonyl, 2-chloro-4-methylthiazole-(1,3)-5-carbonyl- or -4- or -5-sulphonyl, N-oxide of 4-chloroquinoline- or 4-nitroquinoline-5-carbonyl.

A mention should also go to reactive groups of the aliphatic series, such as acryloyl, monochloroacryloyl, dichloroacryloyl or trichloroacryloyl, such as —CO—CH=CH—Cl, —CO—CCl=CH$_2$, —CO—CCl=CH—CH$_3$, and also —CO—CCl=CH—COOH, —CO—CH=CCl—COOH, β-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutanecarbon-1-yl or -tetrafluorocyclobutanesulphon-1-yl, β-(2,2,3,3-tetrafluorocyclobut-2-yl)-aryloxy, α- or β-bromoacryloyl, α- or β-alkylsulphoacryloyl or -arylsulphoacryloyl group, such as α- or β-methylsulphonylacryloyl, chloracetyl.

In the formula (1), the following groupings are preferred:

T$_1$ and T$_2$=Cl

X=

Y=aliphatic radical

Z=radical of the monofluorotriazine or monochlorotriazine series.

The following dyestuffs are preferred within the scope of the formula (1):

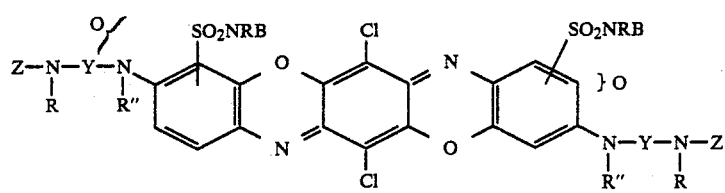
(2)

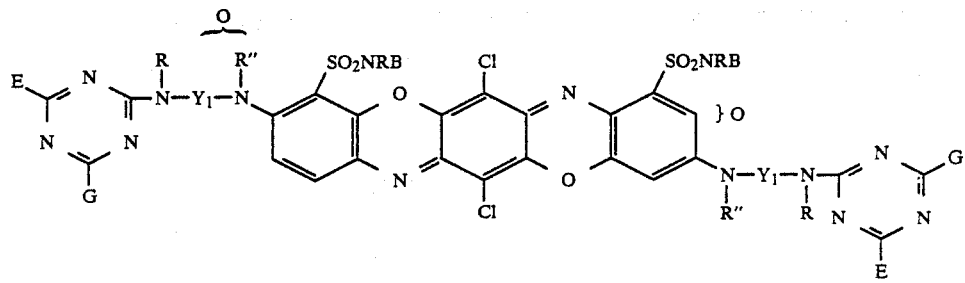
(3)

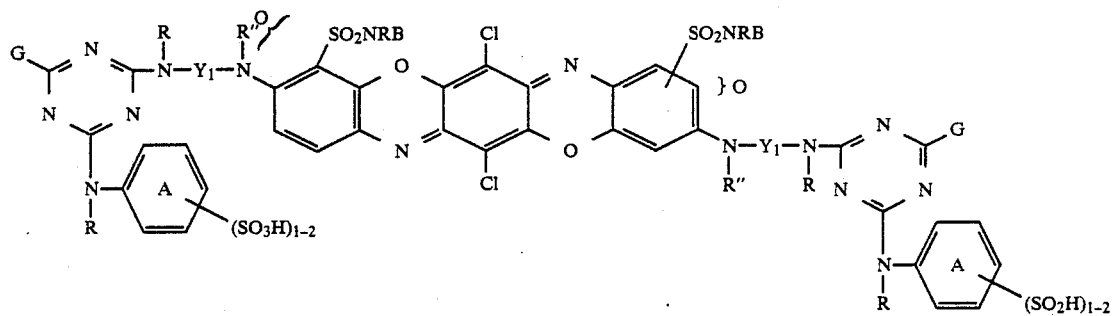
(4)

wherein
G is F or Cl,
E is an optionally substituted amino group,
$Y_1$ is an optionally further-substituted divalent aliphatic radical,
the benzene ring A can be further substituted, preferably by Cl, $C_1$-$C_4$-alkyl, $C_1$-$C_4$-alkoxy or COOH, and
the remaining substituents are as defined in the formula (1).

Also preferred are dyestuffs of the formulae (2), (3) and (4) where
R is H,
$R_1$ is H or $CH_3$ and
B is $CH_2$—$CH_2$—$SO_3H$ or $CH_2$—$CH_2$—$OSO_3H$ and
the remaining substituents are as defined above.

Likewise preferred are dyestuffs of the formulae (3) and (4) where
$Y_1$ is $CH_2$—$CH_2$, $CH_2$—$CH_2$—$CH_2$ or $CH_2$—$CH_2$—$CH_2$—$CH_2$ and
G is F and
the remaining substituents are as defined above.

The invention also provides a process for preparing the reactive dyestuffs of the formula (1) which is characterised in that 1 mole of a triphendioxazine dyestuff of the formula

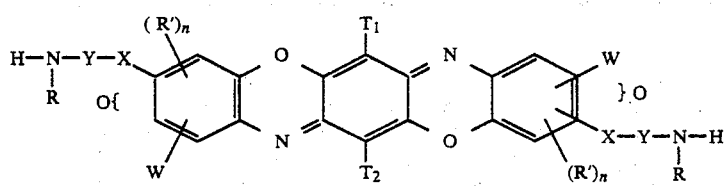
(5)

is condensed with at least 2 moles of a reactive component of the formula $$U-Z \quad (6)$$

wherein U signifies a substituent (preferably halogen) detachable as an anion, by elimination of U—H. This acylation is generally carried out at temperatures of 0° to 80° C., depending on the reactivity of 6, in water and in a weakly alkaline, neutral or weakly acid medium.

Suitable reactive components of the formula (6) are for example the parent compounds of the abovementioned reactive groups, i.e. in general the parent halides of the abovementioned reactive groups Z, in particular the corresponding chlorides.

In a further variant of the preparation of preferred dyestuffs of the formulae (3) and (4), a dyestuff of the formula (5) is condensed in any order with a triazine of the formula

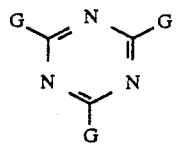

(7)

and an amine of the formula

H—E     (8)

For instance, (a) 1 mole of a dyestuff of the formula (5) can be condensed with 2 moles of a triazine of the formula (6), and the bisacylation product can then be reacted with 2 moles of an amine of the formula (8). (b) 2 moles of a triazine of the formula (7) and 2 moles of an amine of the formula (8) can be condensed and the primary condensation product can be reacted with 1 mole of a dyestuff of the formula (5).

The dyestuffs of the formula (5) can be prepared by known methods.

They are obtained from the dianilides of the formula

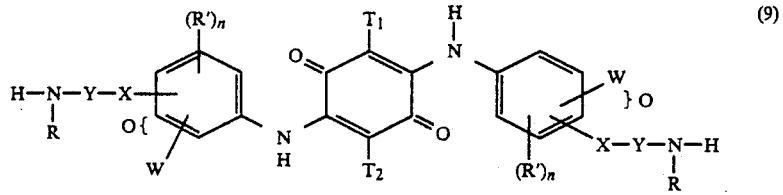

(9)

by ring closure with an acid condensing agent. Examples of suitable acid condensing agents are: (a) oleum as described in Examples 1, 123 and 124 German Offenlegungsschrift No. 2,302,382, in Examples 1, 4, 126, 183 and 184 of German Offenlegungsschrift No. 2,503,611, in Example 1 of U.K. Patent Application No. 2,059,985 and in Examples 1, 114, 235, 282 and 365 of German Offenlegungsschrift No. 2,823,828. (b) oleum and stoichiometric amounts of persulphate as described in British Patent Specification No. 1,589,915 or in Example 125 of German Offenlegungsschrift No. 2,823,828. (c) oleum in the presence of catalytic amounts of iodine, ring closure being effected with 10–50% strength oleum and at 0°–40°.

It is preferred to prepare dyestuff (5) by methods b and c.

Ring closure according to a, b and c can be accompanied by sulphation of aliphatic OH groups and sulphonation of aromatic rings.

The dianilides of the formula (6) can be obtained by methods as described in Example 1 of German Offenlegungsschrift No. 2,503,611 and in particular in Examples 1, 114, 125, 235, 282, 317, 339 and 365 of German Offenlegungsschrift No. 2,823,828.

For example, compounds of the formula (9) can be obtained by reacting quinones of the formula

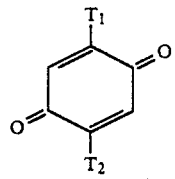

(10)

with 2 moles of a diamine of the formula

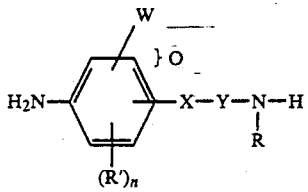

(11)

wherein $T_1$, $T_2$, $R'$, $R$, $X$, $Y$, $W$ and $n$ are as defined above.

To carry out the reaction between the quinone (10) and the diamine (11) it is frequently preferred to use an amount of quinone (10) in excess to the amount required for the reaction. For example, up to about 3 moles of quinone can be added to the reaction mixture.

This reaction has been found to be particularly suitable for products in which $T_1$ and $T_2$ each represent H or $C_{1-4}$-alkyl which is optionally substituted by OH or $C_{1-4}$-alkoxy.

Examples of quinones of the formula (10) are: 1,4-benzoquinone, 2-methyl-1,4-benzoquinone, 2-ethyl-1,4-benzoquinone, 2-n-propyl-1,4-benzoquinone, 2-isopropyl-1,4-benzoquinone, 2,2'-ethoxyethyl-1,4-benzoquinone, 2-phenyl-1,4-benzoquinone, 2-(4'-methylphenyl)-1,4-benzoquinone, 2-(4'-methoxyphenyl)-1,4-benzoquinone, 2-(3'-chlorophenyl)-1,4-benzoquinone, 2-(4'-nitrophenyl)-1,4-benzoquinone, 2,5-dimethyl-1,4-benzoquinone, 2-methyl-5-ethyl-1,4-benzoquinone, 2-methyl-5-cyclohexyl-1,4-benzoquinone, 2-cyclohexyl-1,4-benzoquinone, 2,5-dibenzyl-1,4-benzoquinone, 2,5-dicyclohexyl-1,4-benzoquinone, 2-phenyl-5-methoxy-1,4-benzoquinone and 2-benzyl-5-methoxy-1,4-benzoquinone.

Examples of diamines of the formula (11) are

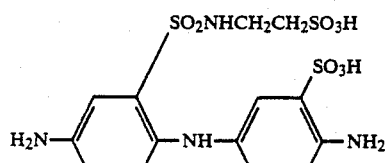

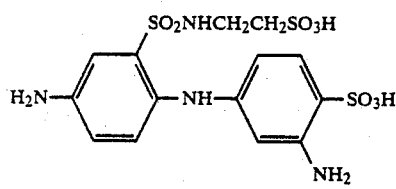

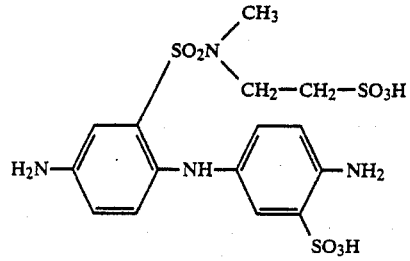
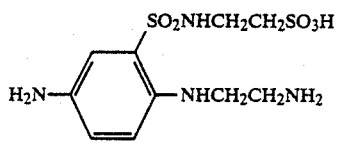
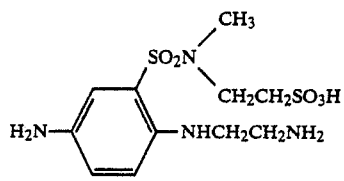
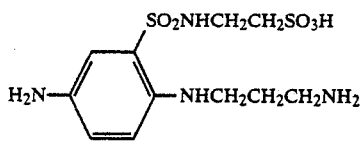
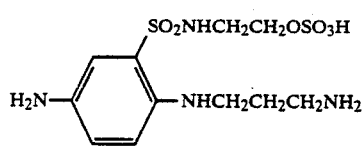
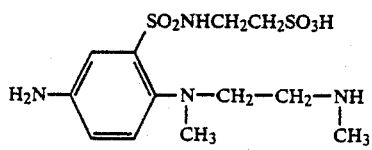
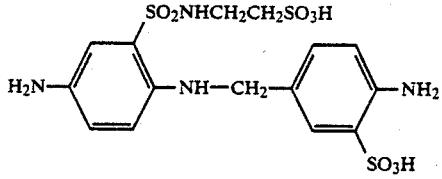
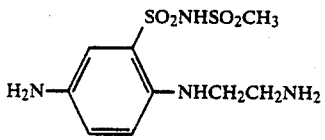
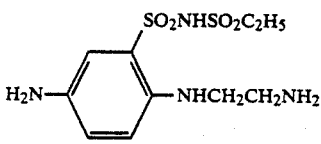
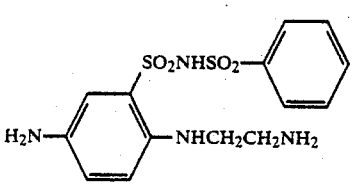

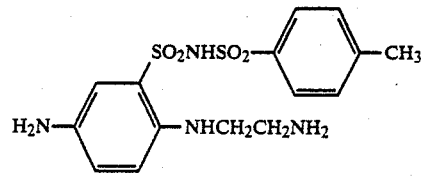
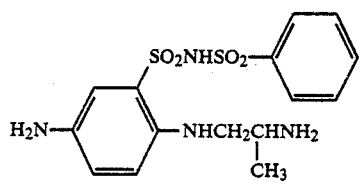
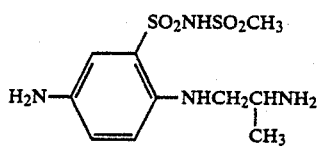
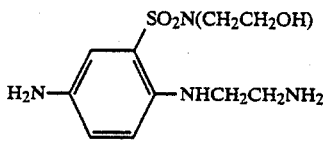

(Sulphation on ring closure in oleum)

Alternatively, aminotriphendioxazine compounds for use in the process according to the invention can be prepared by reacting quinones of the formula

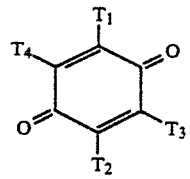

(12)

wherein
$T_1$ and $T_2$ are as defined above,
one of the symbols $T_3$ and $T_4$ represents H, Cl or Br while the other represents Cl or Br,
with a diamine of the formula (11).

Examples of quinones of the formula (12) are: 2,3,5,6-tetrachloro-1,4-benzoquinone, 2,3,5,6-tetrabromo-1,4-benzoquinone, 2-methyl-3-chloro-1,4-benzoquinone, 2-methyl-6-chloro-1,4-benzoquinone, 2-methyl-3,5-dichloro-1,4-benzoquinone, 2-methyl-3,5,6-tribromo-1,4-benzoquinone, 2-(4'-methylphenoxy)-3,6-dibromo-1,4-benzoquinone, 2-(3'-methylphenoxy)-3,6-dibromo-1,4-benzoquinone, 2-methyl-3,5,6-trichloro-1,4-benzoquinone, 2-methyl-3-chloro-5-bromo-1,4-benzoquinone, 2-methyl-3,6-dichloro-1,4-benzoquinone, 2-methyl-3,6-dichloro-5-bromo-1,4-benzoquinone, 2-phenyl-3,6-dichloro-1,4-benzoquinone, 2-(4'-methoxyphenyl)-3,6-dichloro-1,4-benzoquinone, 2-(4'-chlorophenyl)-3,6-dichloro-1,4-benzoquinone, 2-(4'-nitrophenyl)-3,6-dichloro-1,4-benzoquinone, 2-(4'-nitrophenyl)-3,5,6-trichloro-1,4-benzoquinone, 2,5-dimethyl-3,6-dibromo-1,4-benzoquinone, 2,5-dimethyl-3-chloro-1,4-benzoquinone, 2-methyl-5-n-propyl-6-bromo-1,4-benzoquinone, 2-methyl-5-isopropyl-3-chloro-1,4-benzoquinone, 2- methyl-5-isopropyl-6-bromo-1,4-benzoquinone and 2-(2'-chlorophenyl)-3,5,6-tribromo-1,4-benzoquinone.

The above method is particularly suitable for preparing aminotriphendioxazines in which $T_1$ represents alkyl or aryl or halogen and $T_2$ represents halogen.

A further process for preparing aminotriphendioxazines for use in the process according to the invention comprises reacting a quinone of the formula

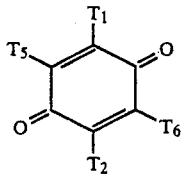
(13)

wherein
$T_1$ and $T_2$ are as defined above,
one of the symbols $T_5$ and $T_6$ represents H, halogen or $OR_2$ while the other represents $OR_2$,
$R_2$ representing alkyl, aryl or aralkyl, all of which can be optionally substituted,
with a diamine of the formula (11).

If both $T_5$ and $T_6$ in the quinone of the formula (13) each represent $OR_2$, they can be identical or different groups or the $OR_2$ type.

Examples of quinones of the formula (13) are: 2-ethyl-3,6-dimethoxy-1,4-benzoquinone, 2-chloro-3,6-dimethoxy-1,4-benzoquinone, 2,3,5-trimethoxy-1,4-benzoquinone, 2,5-dimethyl-3,6-dimethoxy-1,4-benzoquinone, 2,5-dimethyl-3,6-dimethoxy-1,4-benzoquinone, 2-methyl-3,6-dimethoxy-1,4-benzoquinone, 2-methyl-5,6-dimethoxy-1,4-benzoquinone, 2-ethyl-3,6-dimethoxy-1,4-benzoquinone, 2-chloro-3-n-propyl-5-methoxy-1,4-benzoquinone, 2-chloro-3,5-dimethoxy-1,4-benzoquinone, 2-methyl-3-methoxy-1,4-benzoquinone, 2,3,5,6-tetramethoxy-1,4-benzoquinone, 2,3,5,6-tetraphenoxy-1,4-benzoquinone, 2,3,5,6-tetra-(4'-methylphenoxy)-1,4-benzoquinone, 2,3,5,6-tetra-(4'-methoxyphenoxy)-1,4-benzoquinone, 2,3,5,6-tetra-(4'-chlorophenoxy)-1,4-benzoquinone, 2,3,5,6-tetra-(3'-5'-dimethylphenoxy)-1,4-benzoquinone, 2,3,5,6-tetra-4-(3'-methyl-4'-chlorophenoxy)-1,4-benzoquinone and 2,3,5,6-tetra-(2'-naphthoxy)-1,4-benzoquinone.

The process for preparing aminotriphendioxazines is particularly suitable for quinones of the formula (13) wherein $T_1$, $T_2$, $T_5$ and $T_6$ all represent groups which are selected from the types defined above for $OR_2$.

Examples of triazines of the formula (7) which are used in the preparation of preferred dyestuffs of the formulae (3) and (4) are 2,4,6-trichlorotriazine and 2,4,6-trifluorotriazine.

Examples of amines of the formula (8) which can be used as starting materials in the preparation of fibre-reactive dyestuffs of the formulae (3) and (4) are ammonia, methylamine, dimethylamine, ethylamine, diethylamine, propylamine, isopropylamine, butylamine, dibutylamine, isobutylamine, sec.-butylamine, hexylamine, methoxyethylamine, ethoxyethylamine, methoxypropylamine, chloroethylamine, hydroxyethylamine, dihydroethylamine, hydroxypropylamine, aminoethansulphonic acid, β-sulphatoethylamine, benzylamine, cyclohexylamine, aniline, o-,m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, 2-methoxy-5-methylaniline, 2-ethoxy-5-methoxyaniline, 4-bromoaniline, 4-aminophenylsulphamide, 3-trifluoromethylaniline, 3- and 4-aminophenyl urea, 1-naphthylamine, 2-naphthylamine, 2-amino-1-hydroxy-naphthaline, 1-amino-4-hydroxy-naphthaline, 1-amino-8-hydroxynaphthaline, 1-amino-2-hydroxynaphthaline, 1-amino-7-hydroxy-naphthaline, orthanilic acid, metanilic acid, sulphanilic acid, aniline-2,4-disulphonic acid, aniline-2,5-disulphonic acid, aniline-3,5-disulphonic acid, anthranilic acid, m- and p-aminobenzoic acid, 4-aminophenylmethanesulphonic acid, 2-aminotoluene-4-sulphonic acid, 2-aminotoluene-5-sulphonic acid, p-aminosalicylic acid, 1-amino-4-carboxybenzene-3-sulphonic acid, 1-amino-2-carboxybenzene-5-sulphonic acid, 1-amino-5-carboxybenzene-2-sulphonic acid, 1-naphthylamine-2-, 3-, 4-, 5-, 6-, 7- and 8-sulphonic acid, 2-naphthylamine-1-, 3-, 4-, 5-, 6-, 7- and 8-sulphonic acid, 1-naphthylamine-2,4-, 2,5-, 2,7-, 2,8-, 3,5-, 3,6-, 3,7-, 3-8, 4,6-, 4,8- and 5,8-disulphonic acid, 2-naphthylamine-1,5-, 1,6-, 1,7-, 3,6-, 3,7-, 4,7-, 4,8-, 5,7- and 6,8-disulphonic acid, 1-naphthylamine-2,4,6-, 2,4,7-, 2,5,7-, 3,5,7-, 3,6,8- and 4,6,8-trisulphonic acid, 2-naphthylamine-1,3,7-, 1,5,7-, 3,5,7-, 3,6,7-, 3,6,8- and 4,6,8-trisulphonic acid, 2-, 3- and 4-aminopyridine, 2-aminobenzothiazole, 5-, 6- and 8-amino-quinoline, 2-aminopyrimidine, morpholine, piperidine and piperazine, N-β-hydroxyethylaniline, semicarbazide, benzoic acid hydrazide, 4-(β-sulphatoethylsulphonyl)-aniline-3-(β-sulphatoethylsulphonyl)-aniline, 4-amino-1-methoxybenzene-2-sulphonic acid, 4-amino-1-ethoxybenzene-2-sulphonic acid, 4-aminophenol-6-sulphonic acid, 2-aminophenol-5-sulphonic acid, 4-aminotoluene-2-sulphonic acid, β-N-methylamino-propionitrile, β-amino-propionitrile, aminoacetic acid.

The new reactive dyestuffs of the formula (1) are suitable for dyeing and printing hydroxyl- or amide-containing materials, such as textile fibres, yarns and fabrics made of wool, silk, nylon and polyurethane fibres, and for the wash-fast dyeing and printing of natural or regenerated cellulose, cellulose material being advantageously treated in the presence of acid-binding agents and, if desired, under heat using the methods disclosed for reactive dyestuffs.

The dyestuffs of the formula (1) where Z is H are used as intermediates for the corresponding reactive dyestuffs.

The formulae shown are those of the corresponding free acids. The dyestuffs are generally isolated, and used in dyeing, in the form of the alkali metal salts, in particular the sodium salts.

The weights mentioned in the examples relate to the free acid. The numbers used in the examples to characterise the hues are the Colour Index hue indicator numbers.

The formulae given in the following examples relate in each case to one of the isomeric reaction products formed in the course of the reaction; for the position of the substituents in the two outer aromatic rings of the triphendioxazine system of the isomeric reaction products reference is made to what was said under formula (1).

EXAMPLE 1

14.8 g of cyanuric fluoride are added dropwise to an icecold neutral solution of 17.3 g of o-sulphanilic acid in 400 ml of water in the course of 10 minutes, during which the pH 5.5–6.5 is maintained by the simultaneous addition of 15% strength sodium carbonate solution. After the acylation has ended, a solution of 0.045 mole of the dyestuff of the formula the amines listed hereinafter produces further dyestuffs which dye cotton in brilliant blue shades (hue indicator number 13).

Aniline-2,5-disulphonic acid, aniline-2,4-disulphonic acid, m-sulphanilic acid, p-sulphanilic acid, 2-amino-toluene-5-sulphonic acid, 2-amino-toluene-4-sulphonic acid, 2-amino-anisol-5-sulphonic acid, 2-amino-anisol-4-sulphonic acid, 4-amino-anisol-3-sulphonic acid, 4-amino-anisol-2-sulphonic acid, 2-amino-1-chlorobenzene-4-sulphonic acid, 2-amino-1-chlorobenzene-5-sulphonic acid, 2-amino-naphthaline-1,5-disulphonic acid, 1-amino-naphthaline-4,7-disulphonic acid.

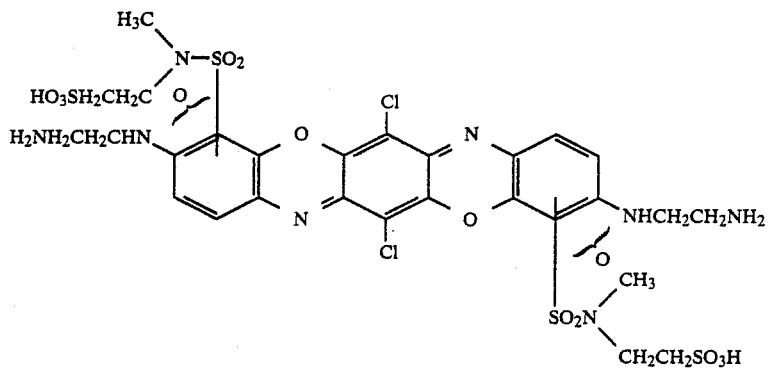

in 400 ml of water and 45 ml of 2N sodium hydroxide solution is added dropwise at 0°–5° C. at such a rate as not to exceed pH 8.8. The condensation is completed at 5° C. and pH 8.5–8.8 by the further addition of 2N sodium hydroxide solution. The dyestuff is salted out by adding 10% by volume of sodium chloride, is filtered off with suction and is dried at 50°–60° C. in vacuo. Grinding produces a blue dyestuff powder which dies cotton in brilliant blue shades (hue indicator number 13). The dyestuff has the formula Example 1 is repeated using for the condensation with 2,4,6-trifluorotriazine the diaminotriphendioxazine dyestuffs listed in column 1 and the amines named in

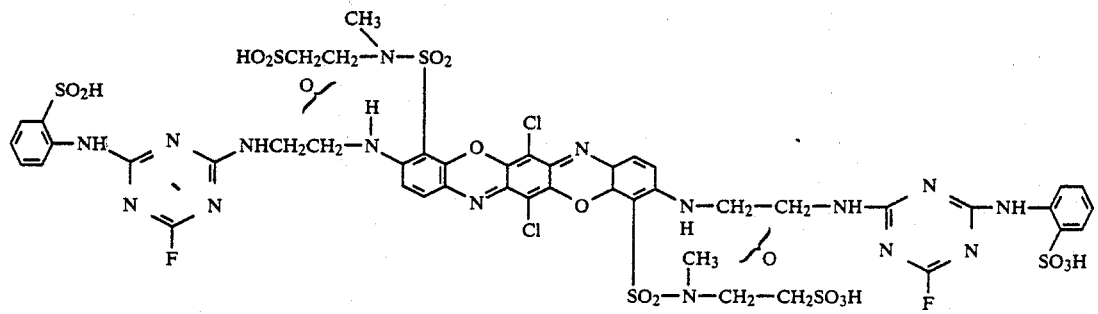

Diacylation of the above diaminotriphendioxazine dyestuff with 2 equivalents of the difluorotriazine compounds prepared in accordance with Example 1 from column 2, likewise affording dyestuffs which dye cotton in brilliant blue shades (hue indicator number 13).

TABLE 1

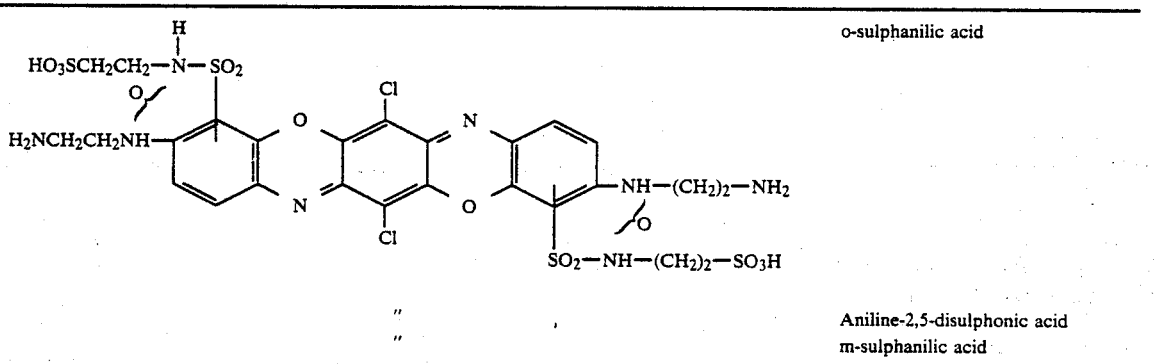

o-sulphanilic acid

Aniline-2,5-disulphonic acid
m-sulphanilic acid

TABLE 1-continued

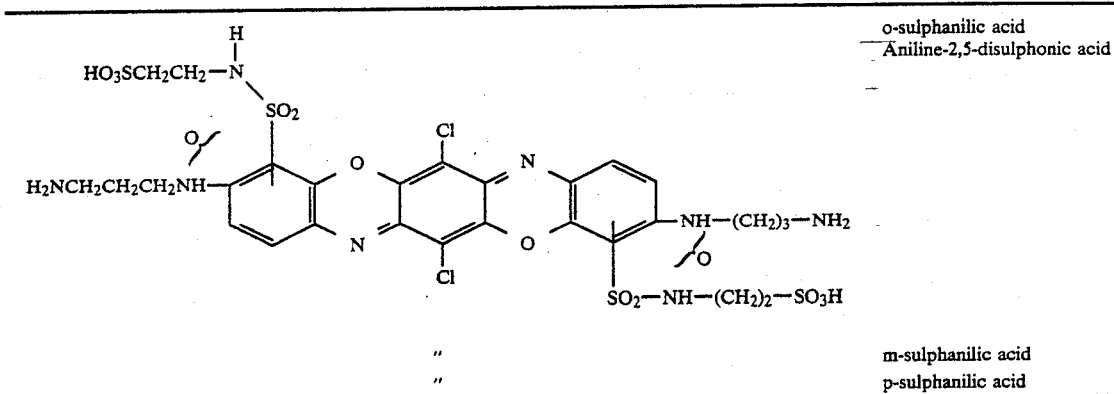

o-sulphanilic acid
Aniline-2,5-disulphonic acid

" m-sulphanilic acid
" p-sulphanilic acid

EXAMPLE 2

15 g of cyanuric fluoride are added dropwise to an icecold neutral solution of 0.05 mole of the diaminotriphendioxazine dyestuff of the formula

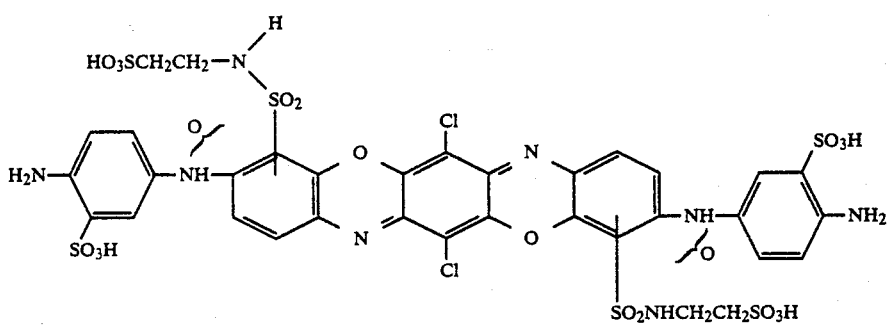

in 500 ml of water in the course of 10 minutes during which pH 5.5–6.5 is maintained by the simultaneous addition of 15% strength sodium carbonate solution. After the acylation of the two amino groups has ended the mixture is brought to pH 9.5 with 25% strength ammonia solution and is stirred at 0° to 3° C. for 3 hours during which pH 9.5–9.7 is maintained by the addition of ammonia solution. The solution is brought to pH 7 by sprinkling in sodium dihydrogenphosphate, and the dyestuff is salted out with sodium chloride. Filtering with suction, drying at 50°–60° C. in a vacuum cabinet and grinding produces a blue dyestuff powder which dyes cotton in brilliant blue shades (hue indicator number 14). The dyestuff has the formula

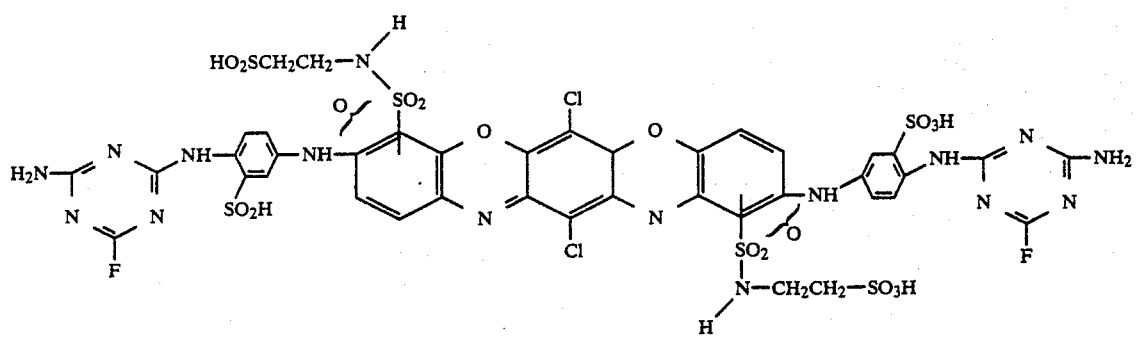

EXAMPLE 3

21 g of cyanuric chloride are added to an icecold neutral solution of 0.05 mole of the diaminotriphendioxazine dyestuff of Example 2 in 500 ml of water, and the mixture is stirred at pH 5.5–6.5 until the acylation of the two amino groups is complete. The solution is then brought to pH 9 with 25% strength ammonia solution, is heated to 35° C. to 40° C., and is stirred under these conditions for 3 hours. It is then brought to pH 7 with sodium hydrogenphosphate, and the dyestuff is salted out. Drying at 80° C. to 90° C. in a vacuum drying cabinet produces a blue dyestuff powder which dyes cotton in brilliant blue shades (hue indicator number 14). The dyestuff has the following formula

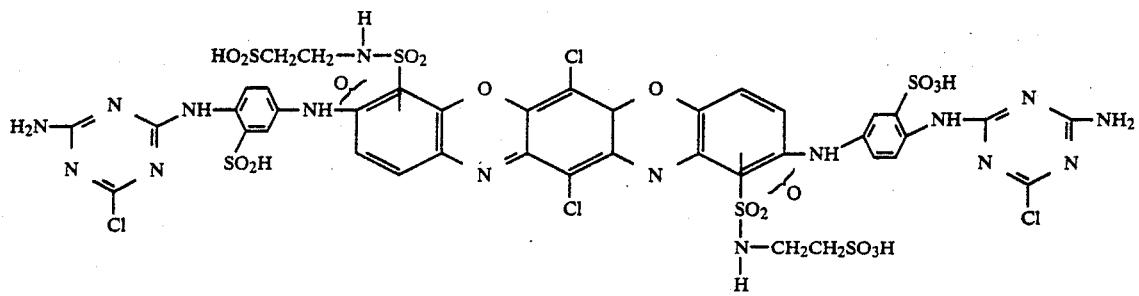

EXAMPLE 4

0.05 mole of the dyestuff of the formula

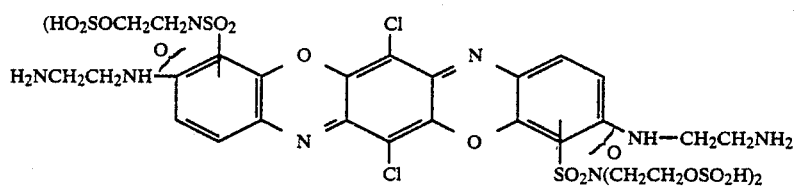

is suspended in 500 ml of water. 16.8 g of 2,4,6-trifluoro-5-chloropyrimidine are added dropwise at 10° C., and pH 8.5–8.8 is maintained by the addition of 2N sodium hydroxide solution. After the acylation has ended the dyestuff is salted out, is filtered off with suction, is dried at 60° C. in a vacuum drying cabinet and is ground. This produces a blue dyestuff powder which dyes cotton in brilliant blue shades (hue indicator number 13).

The dyestuff has the formula

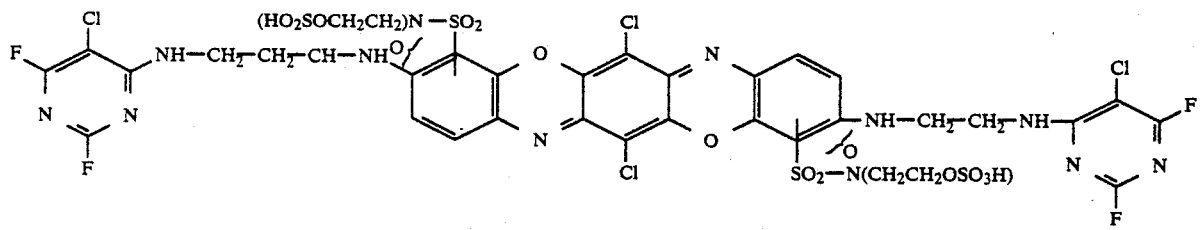

If this example is repeated using the reactive components listed below in place of 2,4,6-trifluoro-5-chloropyrimidine, this likewise produces useful reactive dyestuffs which dye cotton in brilliant blue shades (hue indicator no. 13).

2,4-Difluoro-5,6-dichloropyrimidine, 2,4-difluoro-5-chloro-6-methyl-pyrimidine, 4,6-difluoro-5-chloropyrimidine, 2-methyl-4,6-difluoro-5-chloropyrimidine, 2-methoxyethoxy-4,6-dichlorotriazine.

EXAMPLE 5

14.8 g of cyanuric fluoride are added dropwise to an icecold neutral solution of 17.3 g of o-sulphanilic acid in 400 ml of water in the course of 10 minutes during which pH 5.5–6.5 is maintained by the simultaneous addition of 15% strength sodium carbonate solution. When acylation is complete a solution of 0.045 mole of the dyestuff of the formula

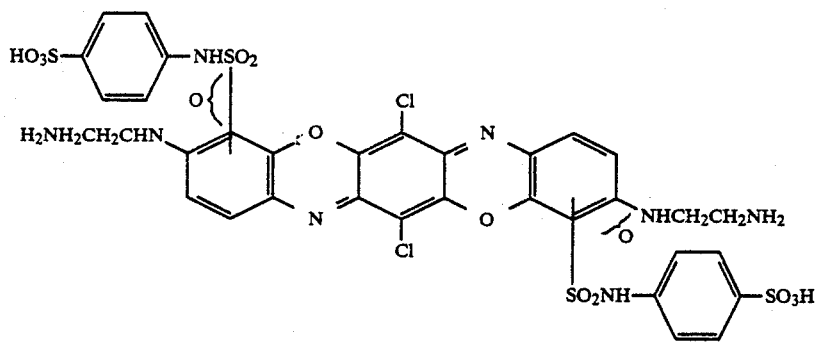

in 400 ml of water and 45 ml of 2N sodium hydroxide solution is added dropwise at 0°–5° C. at such a rate as not to exceed pH 8.8. The condensation is completed at 5° C. and pH 8.5–8.8 by the further addition of 2N sodium hydroxide solution. The dyestuff is salted out by adding 10% by volume of sodium chloride, is filtered off with suction and is dried at 50°–60° C. in vacuo. Grinding produces a blue dyestuff powder which dies cotton in brilliant blue shades (hue indicator number 13). The dye-stuff has the formula

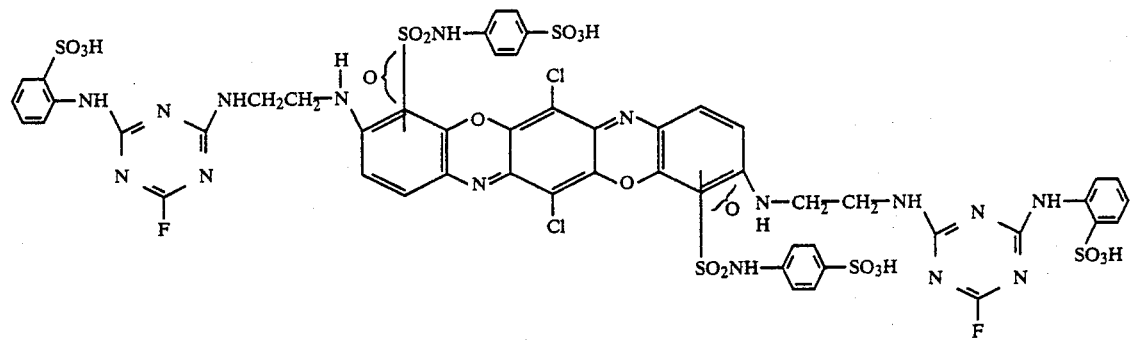

Diacylation of the above diaminotriphendioxazine dyestuff with 2 equivalents of the difluorotriazine compounds prepared in accordance with Example 1 from the amines listed hereinafter produces further dyestuffs which dye cotton in brilliant blue shades (hue indicator number 13).

Aniline-2,5-disulphonic acid, aniline-2,4-disulphonic acid, m-sulphonic acid, p-sulphonic acid, 2-amino-toluene-5-sulphonic acid, 2-amino-toluene-4-sulphonic acid, 2-amino-anisol-5-sulphonic acid, 2-amino-anisol-4-sulphonic acid, 4-amino-anisol-3-sulphonic acid, 4-amino-anisol-2-sulphonic acid, 2-amino-1-chlorobenzene-4-sulphonic acid, 2-amino-1-chlorobenzene-5-sulphonic acid, 2-amino-naphthaline-1,5-disulphonic acid, 1-amino-naphthaline-4,7-disulphonic acid.

If Example 5 is repeated using the listed diaminotriphendioxazines which are characterised by the following general formula and the amines named at the end of Example 1, for the reaction with the trifluorotriazine, this likewise produces dyestuffs which dye cotton in brilliant blue shades.

| $T_1$ | $T_2$ | $B_1$ | R | $-X-Y-\underset{H}{N}-R$ |
|---|---|---|---|---|
| Cl | Cl | —⟨phenyl⟩ | $CH_2CH_2OSO_3H$ | $-CH_2-CH_2-NH_2$ |
| " | " | —⟨phenyl⟩—$SO_3H$ | $CH_3$ | " |
| " | " | —⟨phenyl⟩—$SO_3H$ | $C_2H_5$ | " |
| " | " | —⟨phenyl⟩-$SO_3H$ (meta) | H | " |
| Br | Br | —⟨phenyl⟩ | $-CH_2CH_2OSO_3H$ | " |
| Cl | Cl | —⟨phenyl⟩ | $CH_2CH_2OSO_3H$ | $-CH_2-\underset{CH_3}{CH}-NH_2$ |
| " | " | —⟨phenyl⟩—$SO_3H$ | $C_2H_5$ | " |

-continued

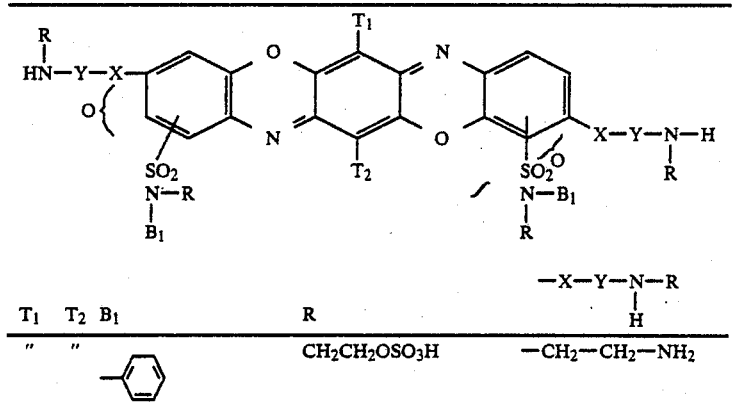

| $T_1$ | $T_2$ | $B_1$ | R | $-X-Y-\underset{H}{\overset{R}{N}}-$ |
|---|---|---|---|---|
| " | " | –⟨phenyl⟩ | $CH_2CH_2OSO_3H$ | $-CH_2-CH_2-NH_2$ |

EXAMPLE 6

12.6 g of 2-aminobenzene-1,4-disulphonic acid are dissolved in 50 ml of water by the dropwise addition of 10% strength sodium carbonate solution and setting of pH 5.5. The solution is cooled down to 0°–5°, 5.0 ml of cyanuric fluoride are added dropwise at 0°–5° in the course of 5 minutes, pH 4.2–4.7 is maintained by means of 10% strength sodium carbonate solution, and the condensation is completed by stirring for a further 20 minutes.

15.0 g of disulphimide component of the formula

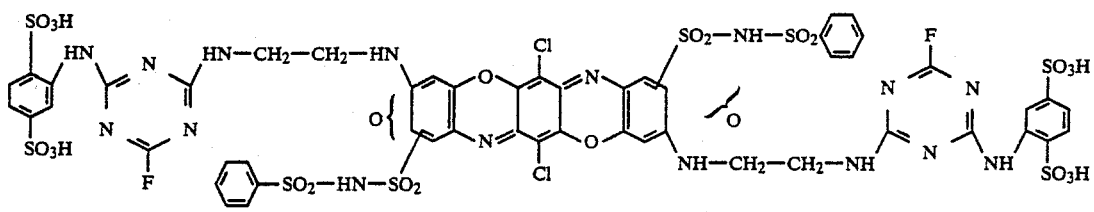

(prepared by condensing 2,3,5,6-tetrachloroquinone with 5-amino-2-(β-amino-ethylamino)-benzenephenyl-disulphamide and subsequent oxidative ring closure of the condensation product in oleum) are suspended in 300 ml of water and dissolved therein at pH 12 by adding 62 ml of 2N sodium hydroxide solution.

The solutions of the reactive component and of the chromophoric system are then simultaneously added dropwise at 0°–5° to 50 ml of water at such a rate that the reaction mixture is at pH 9.0 and in the course of about 15 minutes. To complete the condensation the resulting solution is maintained at 0°–5° for some hours and at pH 8.8–9.0 with 1N sodium hydroxide solution. The temperature is allowed to rise overnight to 20° under continuous pH control, the pH is then brought to 7.5, and the reactive dyestuff obtained is then salted out with 22% of sodium chloride. The precipitate obtained is filtered off with suction, is washed with 25% strength sodium chloride solution and, after addition of phosphates as buffer, is dried at 50° in a circulating air cabinet. The dyestuff obtained has, in the form of the free acid, the formula

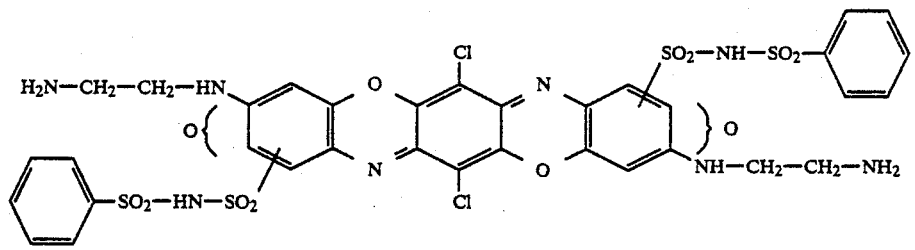

EXAMPLE 7

7.5 g of 2-aminobenzenesulphonic acid are dissolved at pH 6–7 in 90 ml of water. The solution is brought to pH 5.0, 4.3 ml of cyanuric fluoride are added dropwise at 0°–5° in the course of 5 minutes, and pH 4.5–4.8 is maintained with 5% strength sodium carbonate solution, resulting in partial precipitation of the reactive component.

14.0 g of the disulphimide component described in the preceding example are dissolved in 140 ml of water adjusted to pH 12 with 50 ml of 2N sodium hydroxide solution.

The solution of the chromophoric system and the suspension of the reactive component are then introduced at 0°–5° at a uniform rate into 50 ml of water in the course of about 20 minutes in such a way as to produce pH 9.0 and that both of the components have been added at the same time. pH 8.8–9.0 is then further maintained by the dropwise addition of 1N sodium hydroxide solution, an initial partial precipitate going back into solution after a few minutes. From then on the pH and temperature are controlled as described in the preceding example. The dyestuff is salted out of the solution obtained by addition of 10% sodium chloride, the precipitate is filtered off with suction and the filter cake is washed with 10% strength sodium chloride solution.

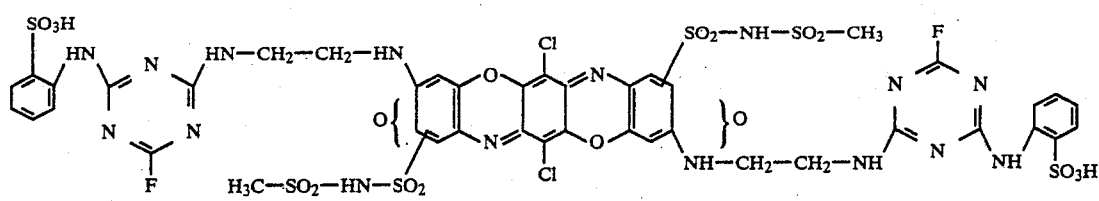

Drying gives the sodium salt of a dyestuff which, in the form of the free acid, has the formula

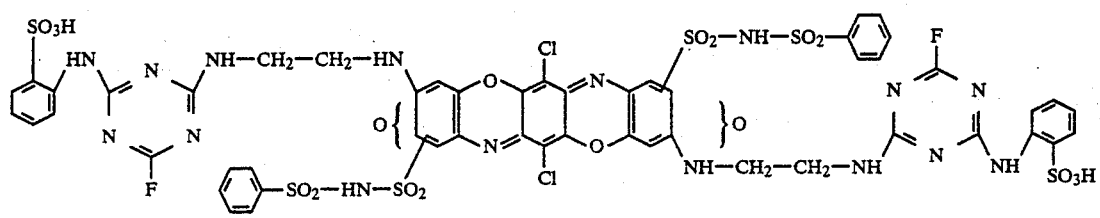

and dyes cotton at 40° and 50° from long liquors in deep bright blue shades.

It dyes cotton at 40° from long liquors in bright blue and produces blue prints with good build-up on cotton and viscose.

EXAMPLE 8

A similar dyestuff of the formula which dyes cotton in bright blues from long liquors, is obtained by replacing the bis-($\beta$-aminoethylamino)-bis-phenyldisulphimidedioxazine in Example 7 by 12.0 g of the corresponding bis-methyldisulphimide and otherwise using the same procedure.

Further dyestuffs dyeing or printing cellulose fibres in bright blues are obtained by condensing the dioxazine components of column 1 in the Table below with the reactive components of column 2 of the Table.

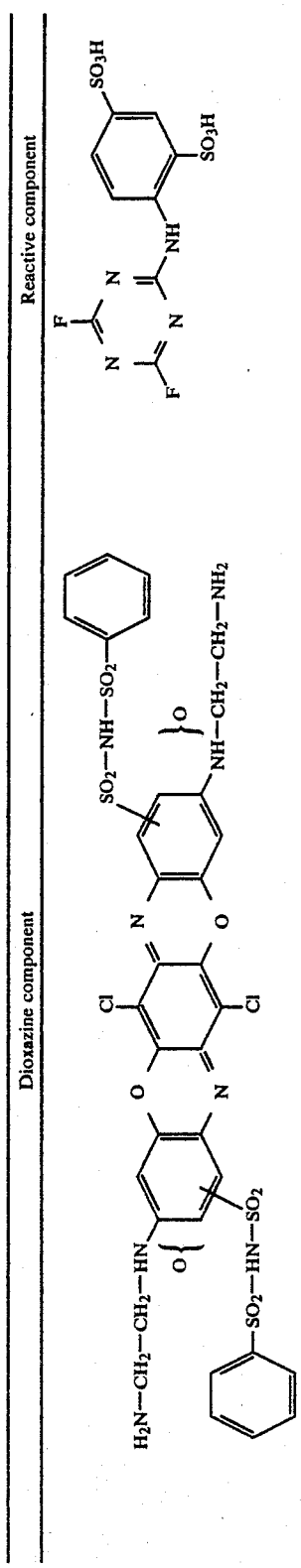
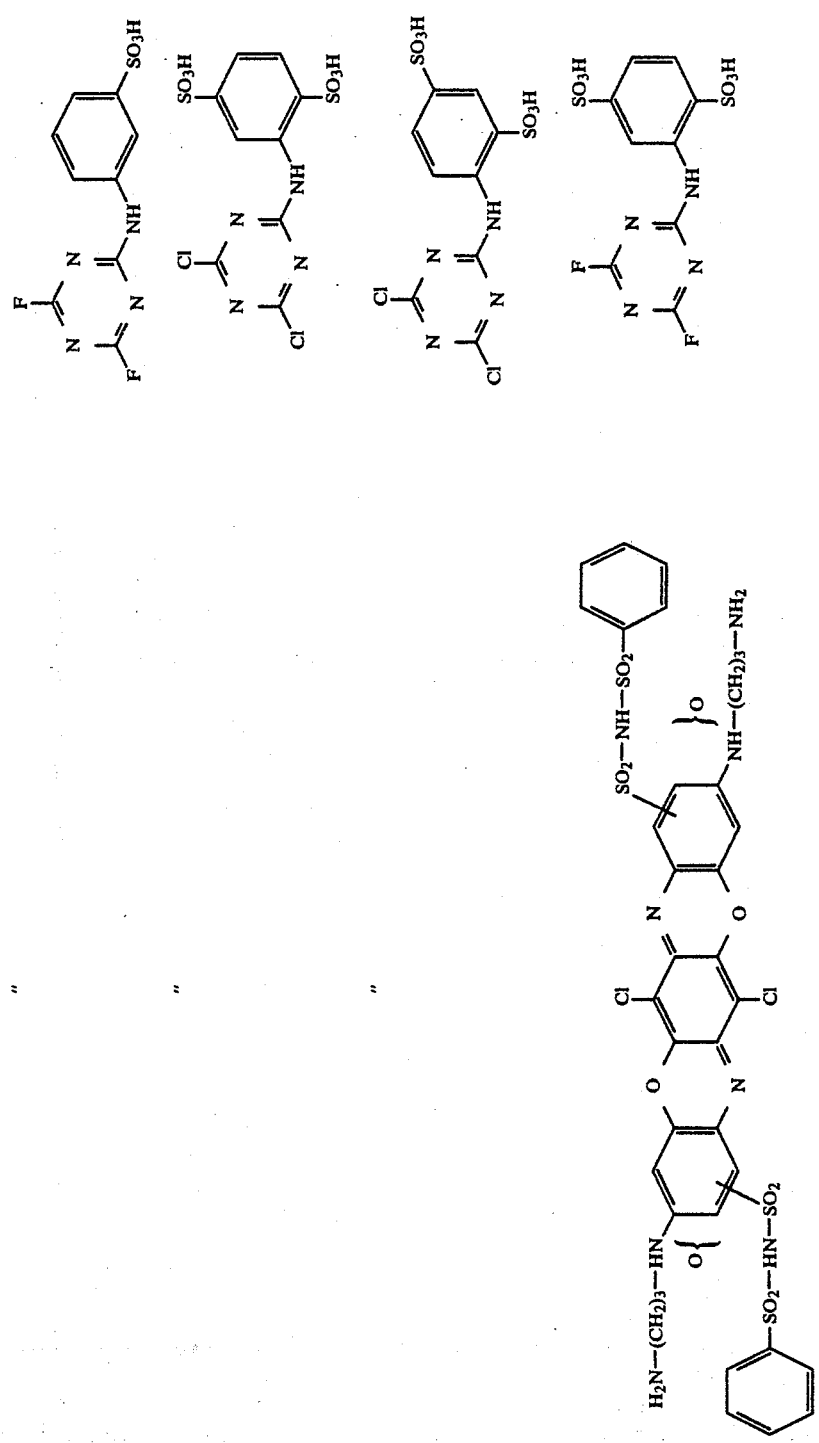

| Dioxazine component | Reactive component |
|---|---|

(table of chemical structures)

EXAMPLE 9

The triphendioxazine dyestuff used in the first tabled example of Example 1 can be obtained as follows:

(a) 84.9 g of the dianilide of the formula

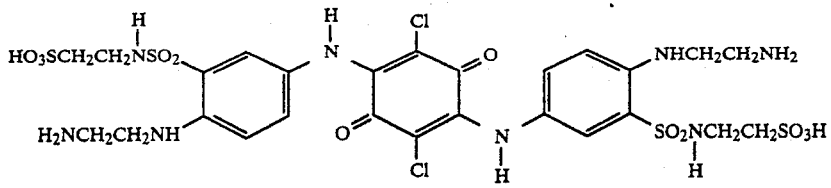

are introduced at 15°–18° into 450 ml of 20% strength oleum. 67.5 g Of potassium persulphate are then added at 15°–18° in the course of an hour at a uniform rate. The mixture is stirred for an hour and is discharged onto an ice-water mixture in such a way that the temperature does not exceed 20°. The dyestuff is filtered off with suction, and the paste is stirred into ice-water. The mixture is adjusted to pH 7 with sodium hydroxide solution, the precipitate is filtered off with suction, and the paste is washed with water. The dyestuff has the formula

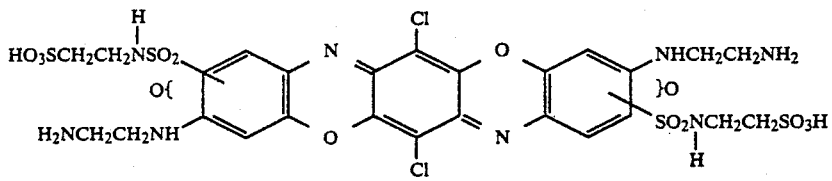

(b) 84.9 g of the dianilide of Example 9(a) are introduced at 15°–80° in the course of an hour into a mixture of 200 ml of 20% strength and 100 ml of 65% strength oleum to which 1 g of potassium iodide has been added beforehand. The mixture is stirred for half an hour and the melt is then discharged onto an ice-water mixture in such a way that the temperature does not exceed 20°.

The further working-up is as in Example 9(a). The resulting dyestuff has the formula given there.

One of the possible isomeric structures is given in each of Examples 1 to 8.

I claim:

1. A triphendioxazine dyestuff of the formula

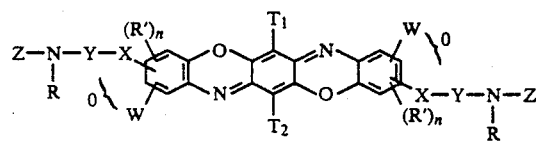

wherein

R represents hydrogen, $C_1$–$C_6$-alkyl, optionally substituted by OH, $OCH_3$, COOH, $SO_3H$ or $OSO_3H$ $T_1$ and $R_2$, independently of each other, each represent H, Cl, Br, $C_1$–$C_4$-alkyl, $C_1$–$C_4$-alkoxy, phenyl or phenoxy X represents O, S or

Z denotes a reactive group or hydrogen

Y represents $-(CH_2)_{2-6}-$, 1,4- or 1,3-phenylene optionally substituted by $CH_3$, $SO_3H$ or COOH R' represents Cl, Br, $SO_3H$, COOH, $C_1$–$C_4$-alkyl or $C_1$–$C_4$-alkoxy R'' represents H, $C_1$–$C_4$-alkyl, and in the event that Y denotes $-(CH_2)_{2-6}-$ also together with R denotes $-(CH_2)_2-$ W represents one of the following meanings:

(a) radical of the formula

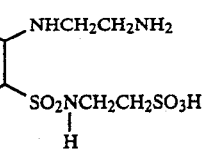

wherein

B is $C_2$–$C_6$-alkylene–$(O)_n$–$SO_3H$ wherein n is 0 or 1

(b) radical of the formula $-SO_2-NH-SO_2-R'''$ wherein

R''' represents $C_1$–$C_6$-alkyl, phenyl, optionally substituted by $CH_3$ (c) radical of the formula

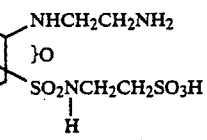

wherein $B_1$ is phenyl having 1–2 sulfo groups the radical W is in the ortho-position relative to the substituent

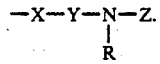

2. A reactive dyestuff according to claim 1 of the formula

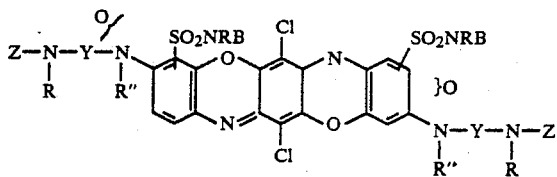

3. A reactive dyestuff according to claim 1 of the formula

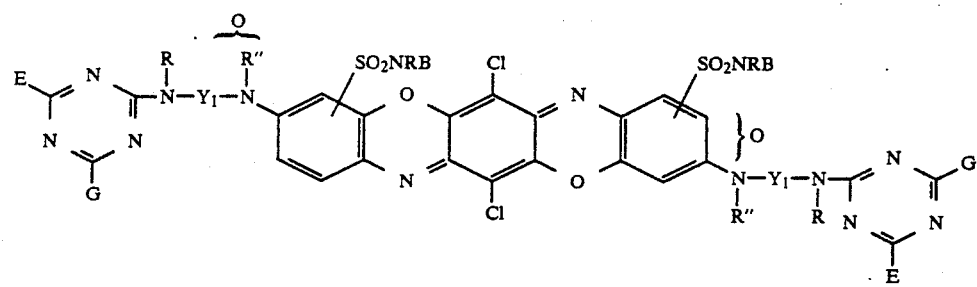

wherein
G is F or Cl,
E is $NH_2$; mono- and di-$C_1$-$C_4$-alkylamino optionally substituted by OH, COOH, sulfo, sulfate, CN, $C_1$-$C_4$-alkoxy; phenyl-$C_1$-$C_4$-alkylamino, optionally substituted by $SO_3H$, $C_1$-$C_4$-alkyl, $C_1$-$C_4$-alkoxy, carboxy, halogen or acylamino in the phenyl ring; phenylamino or naphthylamino, optionally substituted by sulfo, $C_1$-$C_4$-alkyl, $C_1$-$C_4$-alkoxy, carboxy, halogen, acylamino, and
$Y_1$ is $-(CH_2)_{2-6}-$.

4. A reactive dyestuff according to claim 3 of the formula

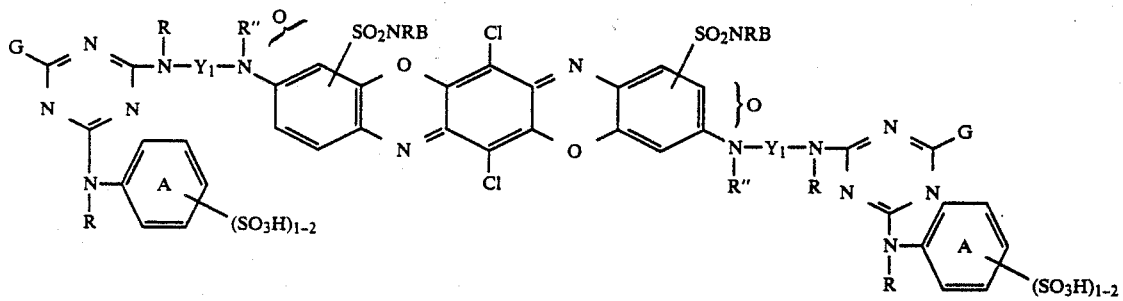

wherein
the benzene nucleus A can contain further substituents selected from Cl, $C_1$-$C_4$-alkyl, $C_1$-$C_4$-alkoxy or COOH.

5. A reactive dyestuff according to claim 2, wherein
R is H
$R_1$ is H or $CH_3$ and
B is $CH_2$—$CH_2$—$SO_3H$ or $CH_2$—$CH_2$—$OSO_3H$.

6. A reactive dyestuff according to claim 3, wherein
$Y_1$ is $CH_2$—$CH_2$, $CH_2$—$CH_2$—$CH_2$ or $CH_2$—$CH_2$—$CH_2$—$CH_2$ and
G is F.

7. Reactive dyestuffs according to claim 3 wherein
R is H
$R_1$ is H or $CH_3$
B is $CH_2$—$CH_2$—$SO_3H$ or $CH_2$—$CH_2$—$OSO_3$—H.

8. Reactive dyestuffs according to claim 4 wherein
R is H
$R_1$ is H or $CH_3$
B is $CH_2$—$CH_2$—$SO_3H$ or $CH_2$—$CH_2$—$OSO_3H$.

9. Reactive dyestuffs according to claim 4 wherein
$Y_1$ is $CH_2$—$CH_2$, $CH_2$—$CH_2$—$CH_2$ or $CH_2$—$CH_2$—$CH_2$—$CH_2$
G is F.

* * * * *

UNITED STATES PATENT AND TRADEMARK OFFICE
CERTIFICATE OF CORRECTION

PATENT NO. : 4,591,643

DATED : May 27, 1986

INVENTOR(S) : Horst Jäger

It is certified that error appears in the above-identified patent and that said Letters Patent is hereby corrected as shown below:

| | |
|---|---|
| Col. 4, line 56 | After "2" insert -- - -- |
| Col. 8, line 33 | Bottom right of formula delete "$(SO_2H)_{1-2}$" and substitute --$(SO_3H)_{1-2}$-- |
| Col. 14, line 22 | After "4,6-," insert --4,7-, -- |
| Col. 15, line 31 and Col. 20, line 68 | Delete "dies" and substitute --dyes-- |
| Col. 17, line 45, Col. 17, line 25, Cols. 19, lines 1, 16 and 50 | Beginning of formula delete "$HO_2$" and substitute --$HO_3$-- |
| Col. 19, line 1 | Beginning of formula delete "$SO_2H$" and substitute --$SO_3H$-- |
| Col. 19, line 23 | Bottom right of formula delete "$OSO_2$" and substitute --$OSO_3$-- |
| Col. 21, line 15 | Middle of formula delete " 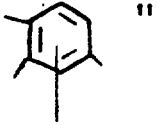 " and substitute: 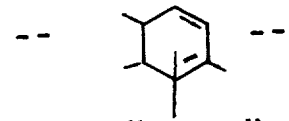  |
| Col. 23, line 7 | To the left of "N—$B_1$" delete "∕" |
| Col. 23, line 40 | Before "disulphimide" insert --a-- |

UNITED STATES PATENT AND TRADEMARK OFFICE
CERTIFICATE OF CORRECTION

PATENT NO. : 4,591,643

DATED : May 27, 1986

INVENTOR(S) : Horst Jäger

It is certified that error appears in the above-identified patent and that said Letters Patent is hereby corrected as shown below:

Col. 26, line 35      Before "Table" delete "the" and substitute --that--

Col. 33, line 37      Delete "15°-80°" and substitute --15°-18°--

Signed and Sealed this

Thirtieth Day of September 1986

[SEAL]

Attest:

DONALD J. QUIGG

Attesting Officer

Commissioner of Patents and Trademarks